United States Patent [19]

Sickles

[11] 4,061,232

[45] Dec. 6, 1977

[54] RECTILINEAR TRANSPORT MEANS

[76] Inventor: Ralph A. Sickles, P.O. Box 3396, Scottsdale, Ariz. 85257

[21] Appl. No.: 748,643

[22] Filed: Dec. 8, 1976

Related U.S. Application Data

[63] Continuation-in-part of Ser. No. 606,229, Aug. 20, 1975, abandoned.

[51] Int. Cl.² .............................................. B65H 29/38
[52] U.S. Cl. ................................. 214/1 BB; 74/84 R; 214/1.3; 352/83
[58] Field of Search .............. 214/1 B, 1 BB, 1.2–1.3; 74/84 R, 89; 226/120, 158, 162; 352/82, 184, 83

[56] References Cited

U.S. PATENT DOCUMENTS

| | | | |
|---|---|---|---|
| 3,199,447 | 8/1965 | Jaffa | 226/120 X |
| 3,844,461 | 10/1974 | Robison | 226/162 X |

*Primary Examiner*—Lawrence J. Oresky
*Assistant Examiner*—George F. Abraham
*Attorney, Agent, or Firm*—Dean and Flickinger

[57] ABSTRACT

The disclosure relates to a rectilinear transport means particularly adapted for transporting a rectangular array of individual photographic film elements one at a time into register with the axis of a projector lens or the like or for the purpose of moving or controlling the movement of other objects in a generally rectilinear manner with respect to a generally rectangular array of elements or portions; the disclosure including a simple mechanical rotary actuator and indexing means wherein the rotary actuator continuously rotates in one direction and drives the indexing means back and forth in a generally serpentine path by engaging successively indexing portions spaced in rows generally parallel to each other and whereby the rotary phase direction of the rotary indexing means when it reaches opposite ends of the rows in the rectilinear path causes a reversal of direction in the movement of the indexing means so as to progressively move in one direction and then the other and wherein the disclosure also relates to means which responds to operation of the rotary actuator for moving the indexing means laterally relative to the rows so as to move from one row to the next at the ends thereof allowing the indexing means to move back and forth relative to the rotary actuator while the rotary actuator rotates only in one direction. The disclosure relating to a variety of species of mechanism for accomplishing the foregoing functions.

19 Claims, 22 Drawing Figures

RECTILINEAR TRANSPORT MEANS

This application is a continuation-in-part application of my co-pending application, Ser. No. 606,229, filed Aug. 20, 1975, now abandoned, for a Rectilinear Transport Means.

BACKGROUND OF THE INVENTION

Heretofore, various photo display projectors have utilized generally circular cards containing a large number of individual photographic films carried thereon in a generally spiral array. However, such mechanisms have not been suitable for the rectilinear transport of a generally rectangular card of member commonly known as a micro fiche which carries a great plurality of generally rectangular photo elements in rectangularly spaced relation to each other; these micro fiche being particularly related to micro film and/or conventional computerized data handling machines. Heretofore, it has been a problem to provide rectilinear transport of such micro fiche relative to the lens of a projector so as to display one film element at a time with relation to the projector and in desired succession and it has also been a problem to afford such a rectilinear transport means within a simple mechanical configuration which is inexpensive, reliable and easy to service and maintain.

SUMMARY OF THE INVENTION

The present invention relates to a rectilinear transport means particularly adapted for use in functions such as the transport of rectangular arrays of photographic films relative to projectors or the like and especially for use in actuating a conventional micro fiche in relation to a projector or the like. The rectilinear transport means of the invention are a simple mechanical arrangement wherein a rotary actuator rotates in one direction only and engages indexing means on a generally rectangular plate or the like and the actuator engages the indexing means which are in generally serpentine rectangular arrangement and such that the rotary actuator progressively engages the indexing means in one straight row then the indexing means is moved laterally to another row and proceeds in the opposite direction and in this manner the indexing means are placed 180° out of phase with relation to the rotor so that it may rotate in the same direction and at each end of each row reverse the directional movement of the entire indexing means and the indexing portions thereon. The indexing means is thus adapted for use in connection with a micro fiche holder which is moveably related to a projector or the like.

According to one specie of the invention, the rotary actuator rotates on an axis generally at right angles to the plane of a plate-like indexing means having projections spaced apart and forming indexing portions; these indexing portions being disposed in generally parallel rows and having means at the end of each row to move the assembly laterally relative to the rows and such that the rotary actuator is in position to engage indexing portions of the next adjacent row.

Another specie of the invention comprises a pair of spaced apart indexing plates with a rotary actuator rotatably mounted between the plates and on an axis generally parallel to the planes of the plates, the rotary actuator being restrained against axial movement and the spaced plates having alternate rows of indexing portions and free areas. The indexing portions, as for example, may be spaced holes in the plates while the free areas may be open slots to allow a projection of the rotary actuator to progressively engage the openings in one plate and run freely in a slot directly opposite to that in the other plate and whereby angular cam slots at the ends of the rows of openings are successively engageable by the projection of the rotor or the rotary actuator such as to shift the indexing means comprising said plates laterally with respect to the rows of openings and whereby each row is progressively shifted laterally as the rotary actuator moves the indexing means to the end thereof.

The rotary actuator is driven by a single revolution clutch on rotation limiting device which normally allows 360 degrees of rotation for each cycle of operation to move the indexing means a distance equal to the spacing of the indexing portions thereon and whereby at one end of the rows of indexing portions the rotary limiting device is provided with means for limiting the rotary actuator for only 180° of rotation since the rotary actuator operates in one rotary direction at all times and thus, the rotary actuator is rotated 360° at one end of each row of indexing portions and rotated only 180° at the opposite end of the respective row of indexing portions.

In both of the foregoing species, the rotary actuator actuates cam means at each opposite end of the respective rows of indexing portions so as to shift the indexing means laterally of the rows of indexing portions to the next adjacent row thereof whereby an entire rectangular area may be rectilinearly follows in relation to a generally rectilinear assembly of photos on micro fiche or the like.

An object of the invention is to provide a rectilinear transport means adapted to move to a great plurality of stations all disposed in a rectangular array; all being accomplished with simple mechanical means.

Another object of the invention is to provide a very simple and economical rectilinear transport means for use in connection with the functions such as display projectors or the like.

Another object of the invention is to provide a simple rectilinear transport means having a rotary actuator adapted to successively engage indexing portions which are each individually arranged in spaced relation to each other and in rows parallel to each other and whereby the rotary actuator rotates in one direction and is provided with a phase shifting means at opposite ends of the rows so as to progressively move the indexing means in one direction by means of one row and then in the opposite direction by means of the next adjacent row during which the rotary actuator continues to rotate in the same direction.

Another object of the invention is to provide a rectilinear actuator having the foregoing features and in addition utilizing a single revolution clutch for controlling the rotary actuator which progressively moves the indexing means from one station to another.

Another object of the invention is to provide a rectilinear transport means which is very simple and economical to produce and maintain and particularly in proportion to the functions that said rectilinear transport means accomplishes.

Further objects and advantages of the invention may be apparent from the following specification, appended claims and accompanying drawings.

DESCRIPTION OF THE PREFERRED EMBODIMENTS

As shown in FIGS. 1, 2, 3 and 5 of the drawings, the rectilinear transport means of the invention is provided with an indexing means 30 which comprises a pair of superimposed plates 32 and 34; these plates 32 and 34 are connected together by end members 36 and 37 which hold the plates 32 and 34 in juxtaposition relative to each other.

Bearing portions 38 and 40 of the plate 34 are slideably mounted on rods 42 and 44 which are in turn supported by carrier bearings 46 and 48 which are slideably mounted on respective rods 50 and 52 carried by upstanding members 54 and 56 of the base frame 58.

As shown best in FIGS. 1, 5, 11, 12 and 13 the indexing means 30 comprises the respective plates 32 and 34 which are disposed in superimposed spaced relationship to each other and rotatably mounted between these plates is a rotary actuator 60 rotatably mounted on a shaft 62; the actuator 60 being restrained against axial movement longitudinally of the shaft 62 which is rotatably mounted on the frame 58 by bearings 64 and 66 carried by respective bearing supports 68 and 70 which are fixed to the frame plate 58.

Figure 1:
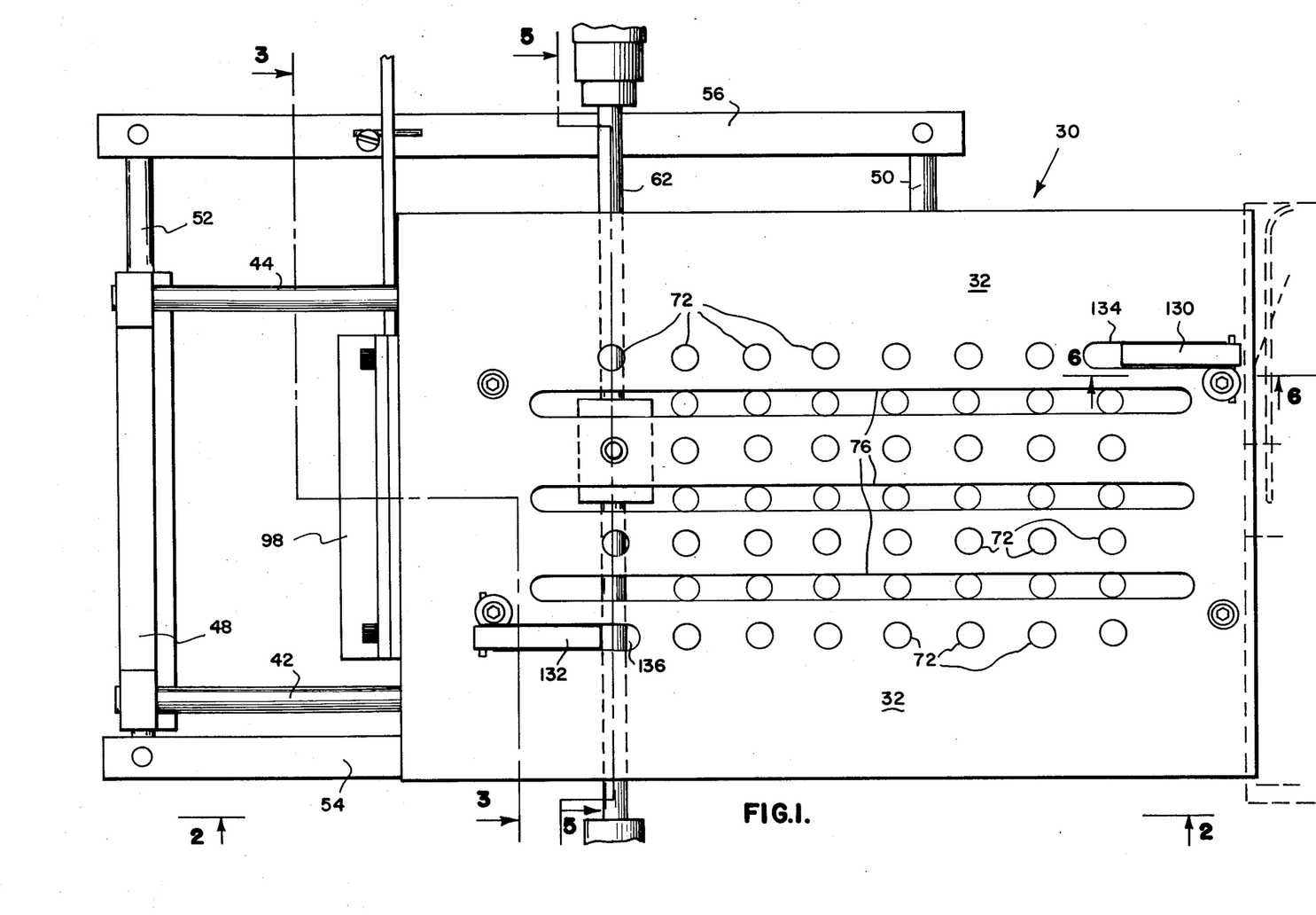
FIG. 1 is a top or planned view of a rectilinear transport means in accordance with the present invention showing by broken lines a fragmentary portion of a micro fiche carrier connected thereto.
Figures 8, 9:
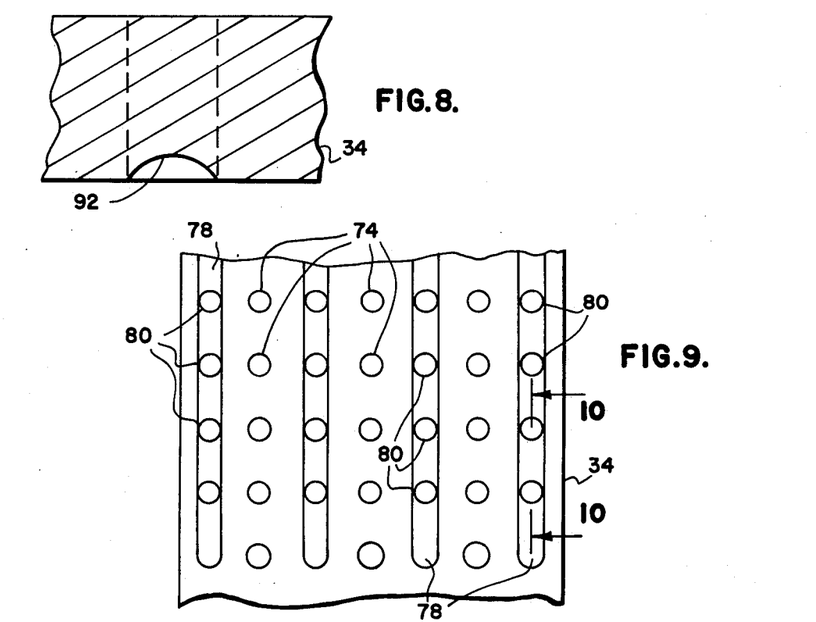
FIG. 8 is an enlarged fragmentary sectional view taken from the line 8—8 of FIG. 7.
FIG. 9 is a reduced fragmentary view taken from the line 9—9 of FIG. 5.

The rotary actuator 60 is provided with a projection 71 which is an index engaging projection; this projection extending radially and operable relative to rows of indexing portions in the plates 32 and 34. The indexing portions as for example only consist of spaced apart openings 72 in plate 32 and similar openings 74 in the plate 34. These openings 72 in the plate 32 are arranged in substantially straight rows and there being four of these straight rows 72 which are generally parallel with each other as shown in FIG. 1 of the drawings and likewise as shown in FIG. 9 there are three rows of the spaced apart openings 74 all of these openings serving as indexing portions of the indexing means 30 provided by the plates 32 ad 34.

The plate 32 is provided with a plurality of open slots 76 therein and these open slots are disposed between the rows of openings 72 and function as will be hereinafter described in detail.

Likewise, the plate 34 is provided with the rows of openings 74 with relief slots 78 between the rows of openings 74 and the slots 76 and 78 are thus adapted to allow freedom of movement of the projection 71 of the rotary actuator 60 as will be hereinafter described.

Figure 5:
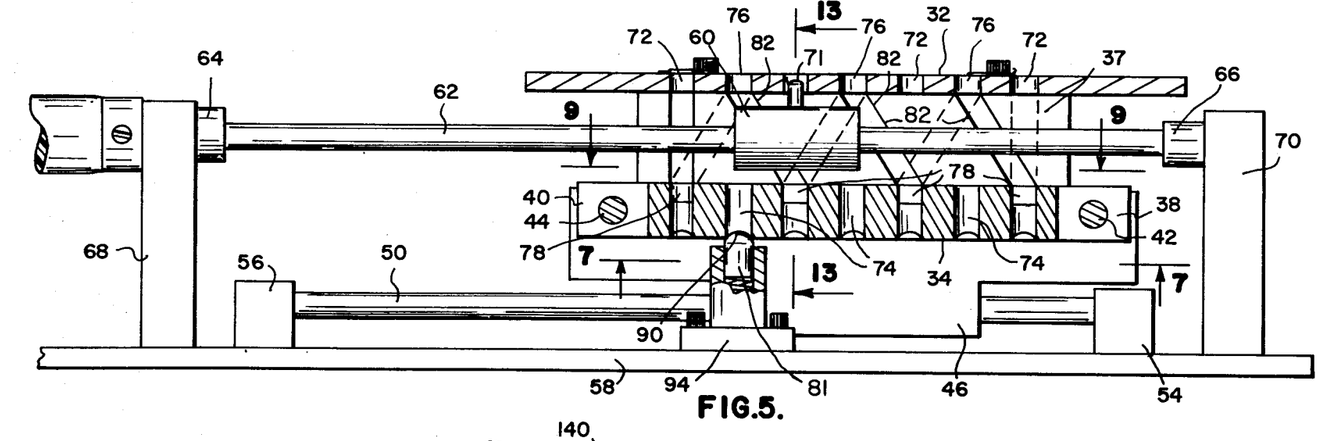
FIG. 5 is a fragmentary sectional view taken from the line 5—5 of FIG. 1.

As shown in FIG. 5 of the drawings, it will be seen that the slots 76 in the plate 32 are disposed directly opposite the rows of openings 74 in the plate 34 and it will also be noted that the rows of openings 72 in the plate 32 are disposed directly opposite to the slotted portions 78 in the plate 34.

Figure 10:
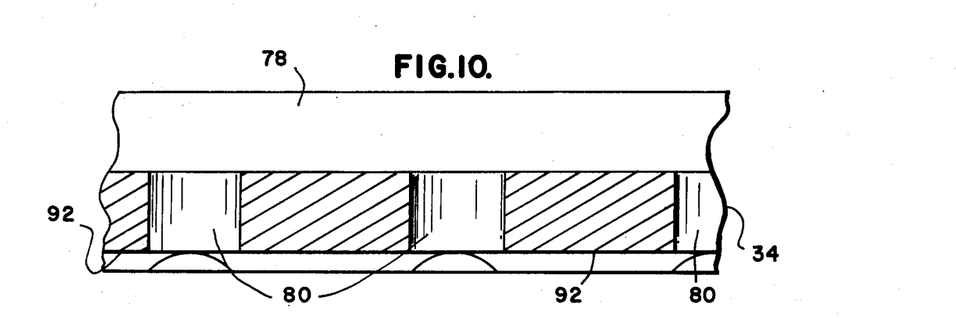
FIG. 10 is an enlarged fragmentary sectional view taken from the line 10—10 of FIG. 9.

The slotted portions 78 are shown in detail in FIG. 10 of the drawings and it will be seen that detent engaging openings 80 in the lower portion of the plate 34 are disposed below the slotted portions 78 are these detent engaging portions 80 are engageable by a spring loaded detent 81 shown in FIG. 5 of the drawings.

Figure 11:
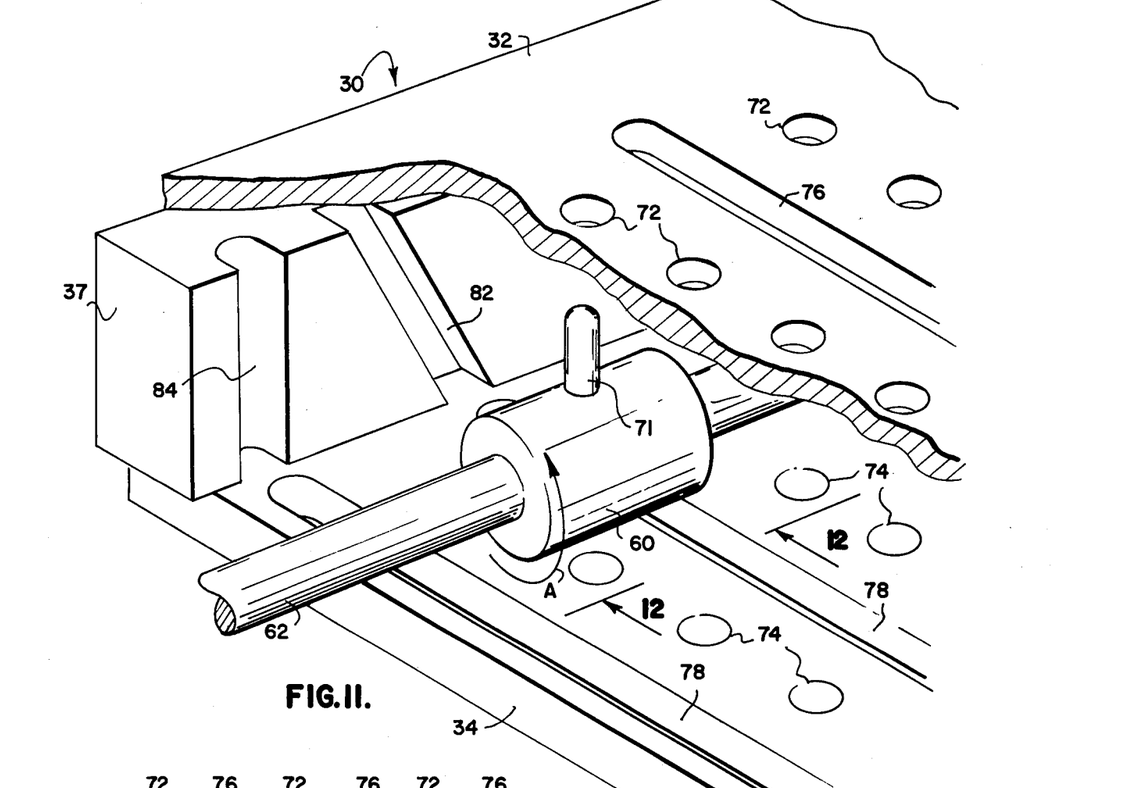
FIG. 11 is a fragmentary perspective view showing a portion of the indexing means of the rectilinear transport means of the invention together with the rotary actuator thereof.
Figure 12:
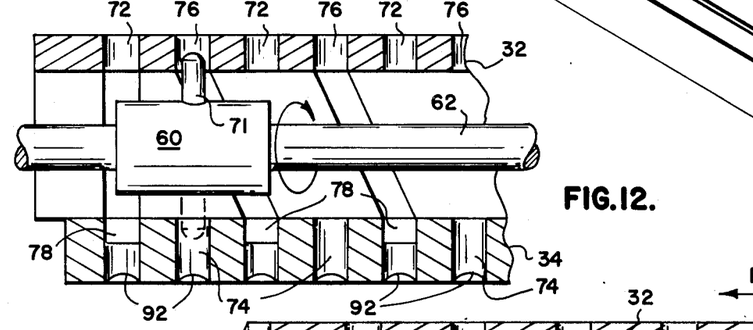
FIG. 12 is a reduced fragmentary sectional view taken from the line 12—12 of FIG. 11.
Figure 13:
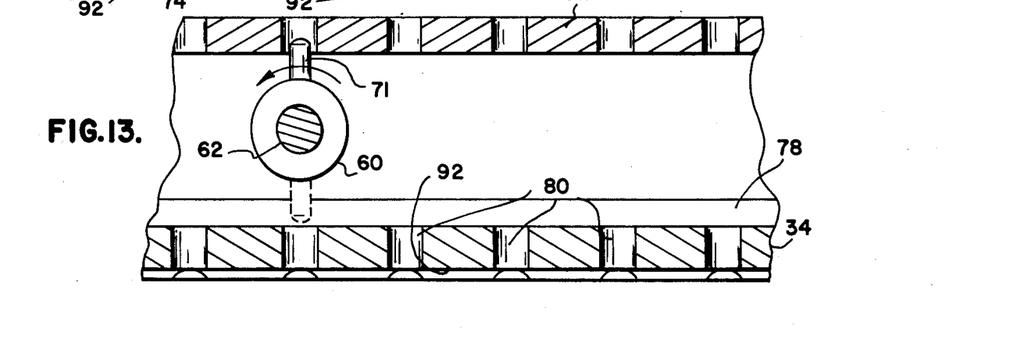
FIG. 13 is an enlarged fragmentary sectional view taken from the line 13—13 of FIG. 5.

The end member 37 shown in FIG. 5 is provided with cam slots one of which is also shown in perspective in FIG. 11 of the drawings; these cam slots are designated 82 and are angularly disposed and extend from the slotted portion 76 in the plate 32 to the slotted portion 78 in the plate 34. This distance equals the distance between the respective adjacent rows of openings 72 and 74 of the plates 32 and 34, hereinbefore described. The cam slots 82 are engageable by the projection 71 as shown in FIG. 11 as the indexing means 30 of the invention is actuated to a position wherein the projection 71 passes angularly through the slot 82 and moves the indexing means 30 laterally relative to the rows of openings 72 and 74 in the plates 32 and 34 respectively. The end member 37 is provided with a relief slot 84 which is disposed at right angles to the plates 32 and 34 and this slot 84 is disposed for relief of the projection 71 as the projection is aligned with one of the rows of openings 72 directly above the slot 78 at a starting position near the end member 37.

Figure 3:
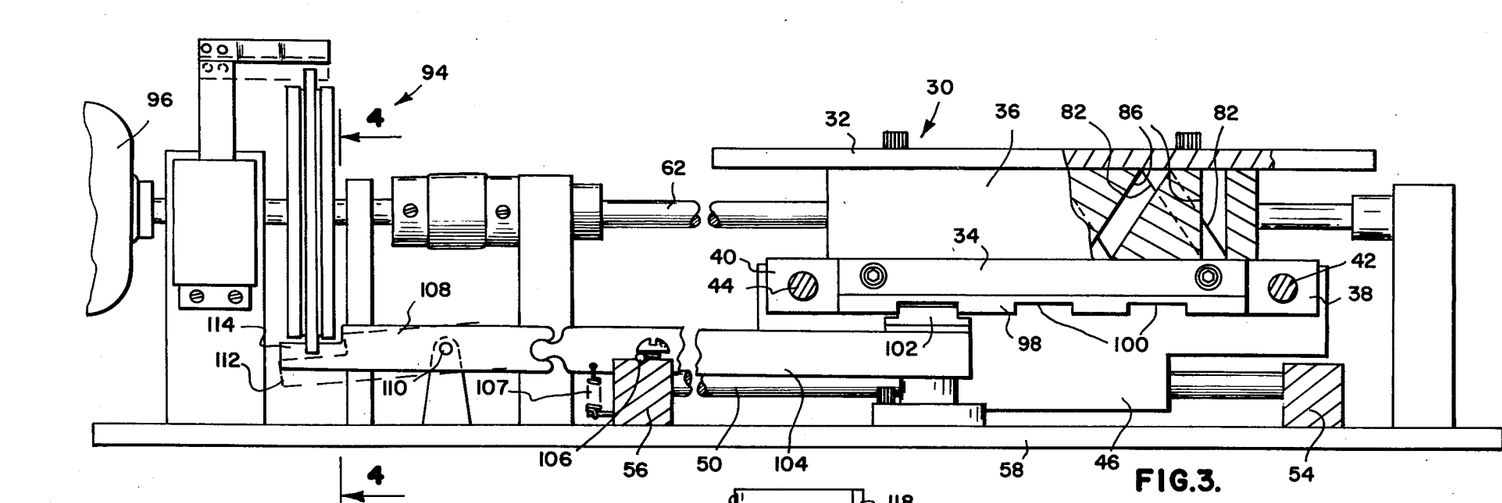
FIG. 3 is a transverse sectional view taken from the line 3—3 of FIG. 1 and showing portions broken away and in sections to ampliphy the illustration.

The end member 36 as shown in FIG. 3 of the drawings, is provided with angular slots 86 which are similar to the slots 82 but arranged in the opposite direction of the slots 82 all as shown best in FIG. 3 of the drawing. The opposite direction of the slots 86 relative to slots 84 provide for movement of the indexing means 30 in the same direction during each lateral movement cycle while the rotary actuator 60 continually rotates in the same direction that is indicated by an arrow A in FIG. 11 of the drawings.

The detent member 81 is provided with a substantially spheroid detent end 90 which is shown in FIGS. 5, 7, 8 and 10 of the drawings is engageable with generally arcuate recess track portions 92 which interconnect all of the openings 80 and 74 in the bottom of the indexing plate 34. These track portions 92 are arcuate in cross section generally conforming to the spheroid portion 90 of the detent 82 and the detent structure 82 is provided with a cylindrical base 94 mounted on the base frame 58 thus the indexing member 82 serves to index the indexing means 30 with respect to each and every one of the openings 72 and the plate 32 and the openings 74 in the plate 34 respectively. While the detent means 82 serves to position the indexing means 30, actuating force of the rotary actuators 60 overcomes the detent 82 each time the rotary actuator moves the indexing means from one position to another by engagement of the projection 71 into one of the openings 72 of one of the openings 74 as will be hereinafter described.

Figure 14:
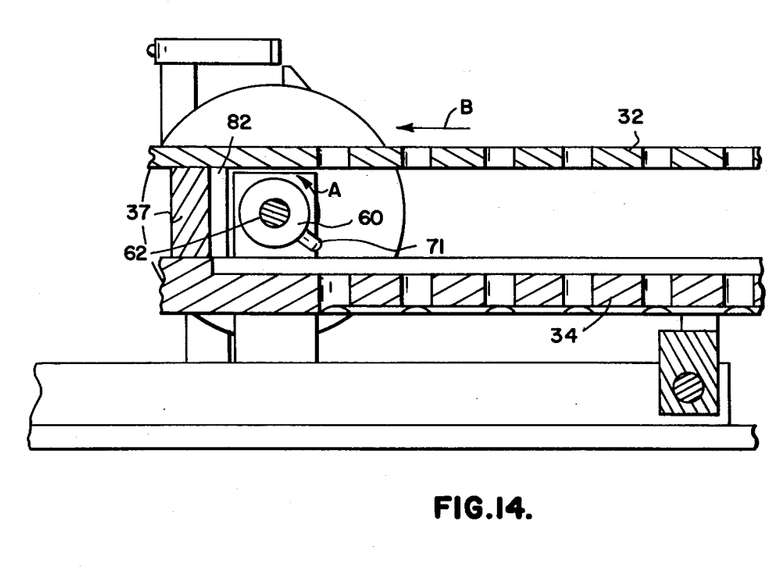
FIG. 14 is a longitudinal sectional view showing diagramatically a position of the rotary actuator with respect to an end of the indexing means of the invention.
Figure 14A:
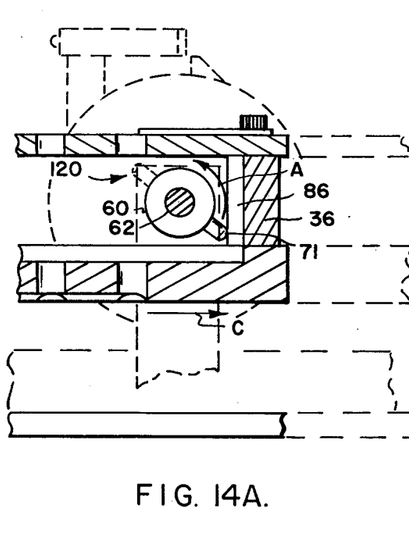
FIG. 14A is a view generally corresponding to the view of FIG. 14 and considered therewith to show diagramatically a position of the rotary actuator with respect to the other end of the indexing means of the invention.

Coupled to the shaft 62 of the rotary actuator 60 is a single revolution clutch 94 which is adapted to be energized momentarily and which causes the projection 71 of the rotary actuator 60 to be rotated about the axis of the shaft 62 almost precisely 360° so that the projection 71 as shown in FIG. 14 always stops in the same position slightly clear of the plate 34 as the actuator rotates in the direction of the arrow A in FIG. 14 of the drawings.

Figure 2:
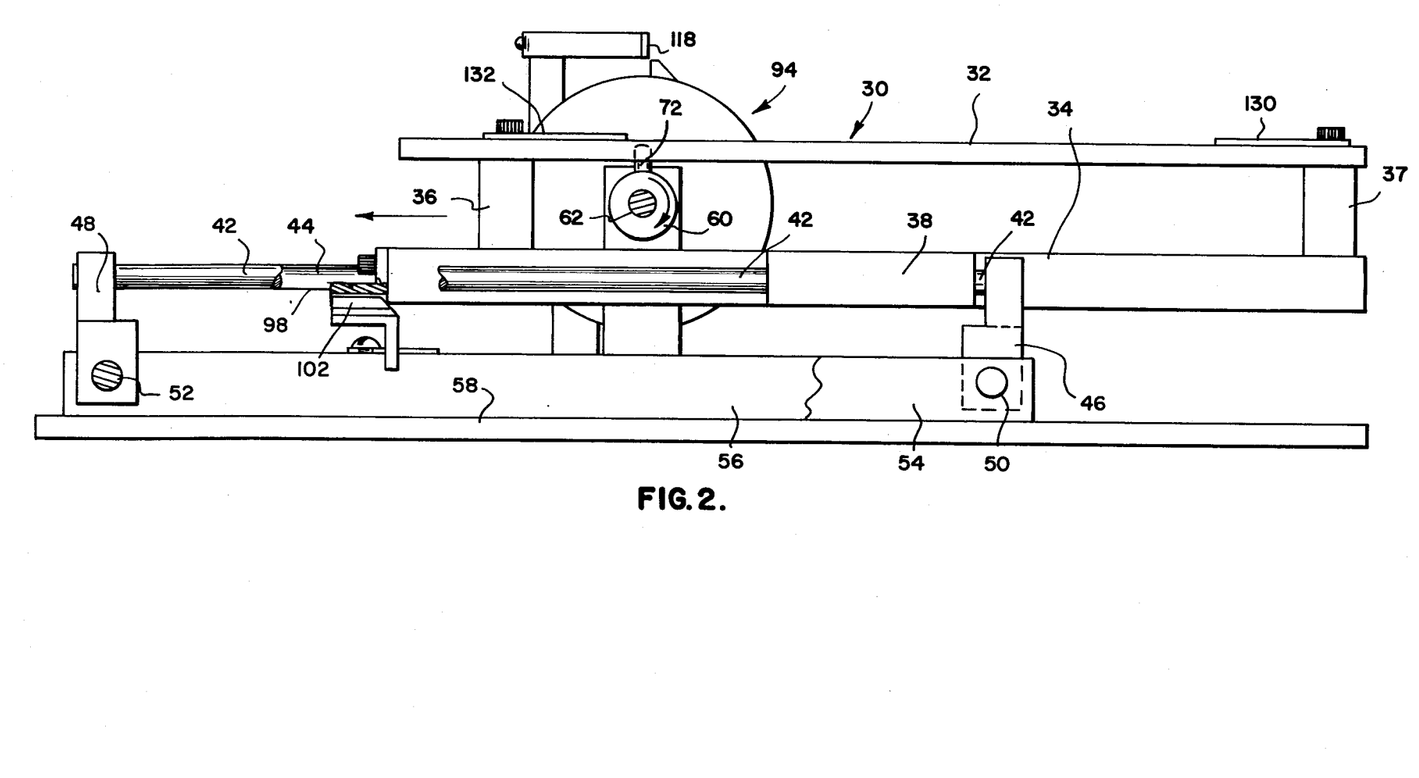
FIG. 2 is a side elevational view of the structure shown in FIG. 1 and taken from the line 2—2 thereof.

It is well known that single revolution clutches may be energized by a simple switch or lever as desired and the single revolution clutch 94 is operated by a motor 96 and the clutch 94 only energized momentarily to rotate the shaft 62 precisely 360 degrees normally and in accordance with a 180 degree cycle control means as shown in FIGS. 1, 2 and 3 of the drawings the single revolution clutch 94 is limited to 180 degrees of rotation when the rotary actuator 60 and its projection 71 pass into one of the slots 86 in the end member 36 all as hereinafter will be described.

The plate 38 carries a lever actuating member 98 as shown in FIG. 2 of the drawings and also in FIG. 1 of the drawings; this member 98 as shown in FIG 3 of the drawings is provided with slotted portions 100 adapted to receive a cam block 102 of an actuating lever 104 pivotally mounted on a pin 106 on the member 56 secured stationary to the frame 58. A spring 107 tends to hold the lever 104 in the solid line position shown in FIG. 3. Cam block 102 is allowed to move upward into one of the slots 100 or 102 when the indexing means 30 is moved to a position wherein the end member 36 is adjacent to the rotary actuator 60 as shown in FIG. 14 at which time the projection 71 is ready to traverse one of the angular slots 86. Under these circumstances the lever 104 in the position shown in FIG. 3 pivots a secondary lever 108 on a pivot pin 110 mounted on the frame 58 and this causes the lever 108 to move from a broken line position 112 to the solid line position shown in FIG. 3 at which time an end position 114 of the lever 108 engages a limiting projection 116 of the single revolution clutch 94 and thus allows the single revolution clutch to rotate only 180° thereby limiting the rotation of the rotary actuator 60 to 180° when shown in the position adjacent to the end 36 as indicated in FIG. 14 of the drawings.

Figure 4:
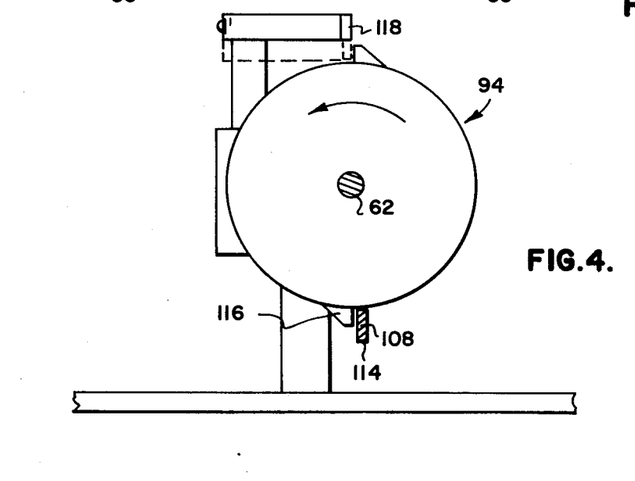
FIG. 4 is a fragmentary sectional view taken from the line 4—4 of FIG. 3.

The single revolution clutch 94 is shown in FIG. 4 is provided with normal 360° limiting stop 118 which as shown in FIG. 14 allows a full 360° of rotation of the rotary actuator 60 adjacent the member 37 and the lever 108 at its end portion 114 causes the single revolution clutch to operate or be limited to only 180° of rotation of operation which prevents the projection 71 of the rotary actuator 60 from engaging one of the openings 74 in the plate 34 after the projection 71 has traversed the respective slot 86 and moved the indexing means laterally of the rows of openings. Thus, the projection 71 after 180° of rotation is stopped at the position designated 120 in FIG. 14 of the drawings and does thereby prevent the projection 71 from passing on around and actuating through one of the openings 74 in the plate 34. This would cause the plate to move laterally from one row to the other of the respective openings and then also cause an additional movement longitudinally of the rows if the rotary actuator 60 were allowed to move 360° cycle adjacent the end member 36.

By contrast when the rotary actuator 60 as shown adjacent the end member 7 in FIG. 14 it merely rotates the projection 71 through the respective angular slot 82 which causes only a single lateral movement of the indexing means from one row of openings to the next row of openings. In each instance the projection 71 moves from the position shown in FIG. 14 to the respective positions indicated by the number of degrees of rotation adjacent the ends 36 and 37. It will be understood that while the projection 71 is traversing a row of holes 74 in the plate 34 that the projection in its 360° rotation also passes through a respective slot 76 in the plate 32. Likewise, when the projection 71 is progressively engaging openings 72 in one of the rows of openings in the plate 32, the projection 71 traverses one of the slots 78 in the plate 34 and since the plates 32 and 34 are 180° out of phase with each other, the rotary actuator 60 may move and rotate in the same direction while alternately moving the indexing means 30 one direction and then the other depending upon whether the projection 71 is engaging progressively in openings 72 in one of the rows of openings or openings 74 in one of the rows of openings in plate 34.

When the rotary actuator 60 has completed the traverse of a row of openings 74 in the plate 34 the projection 71 clears the last opening in the row and stops at the position shown in FIG. 14 wherein the next rotation will cause the projection to enter the slot 82 and move the plate or indexing assembly laterally to the next row and at that time the projection 71 will pass into one of the slots 78 and come to rest in the position shown in FIG. 14 whereupon its next successive operation will be to engage a respective opening 76 of plate 32 to thus move the indexing means in the direction of arrow B in FIG. 14 of the drawings. When the indexing means, comprising the plates 32 and 34 has been moved to a position as shown in FIG. 14 wherein the projection 71 comes to rest adjacent the end 36 the projection 71 has then passed through the last one of the respective openings 72 in that row and successive 180° rotation of the projection 71 causes it to pass through the angular slot 86 and shift the indexing assembly laterally to the next row of openings and the projection 71 is stopped at the 180° position 120 and is then at one of the slots 76. Subsequent energization for 360° rotational cycle of the projection 71 is started and as it rotates the first 180°; it engages an opening 74 in the plate 34 and moves the assembly to a position wherein the lever 104 is released beyond the end of the member 98 and thus allows the lever 108 to release from its position relative to the single revolution clutch and thus the projection 116 is not stopped by the end 114 of the lever 108 and it is allowed to travel on around to the stop 118 for a full 360° revolution. Thus, when the projection 71 starts actuating the plate 34 by engaging the opening 74 therein, the plate is moved in the direction of the arrow C as shown in FIG. 14 of the drawings and in a direction opposite to the arrow B hereinbefore described such as when the projection 71 is operating in a row of openings 72 in the plate 32.

Figure 6:
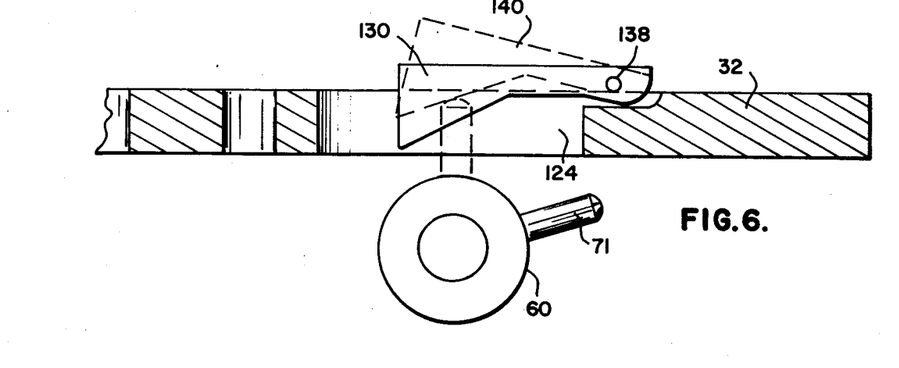
FIG. 6 is an enlarged fragmentary sectional view taken from the line 6—6 of FIG. 1 showing by broken lines the varying position of the parts and portions thereof.
Figure 7:
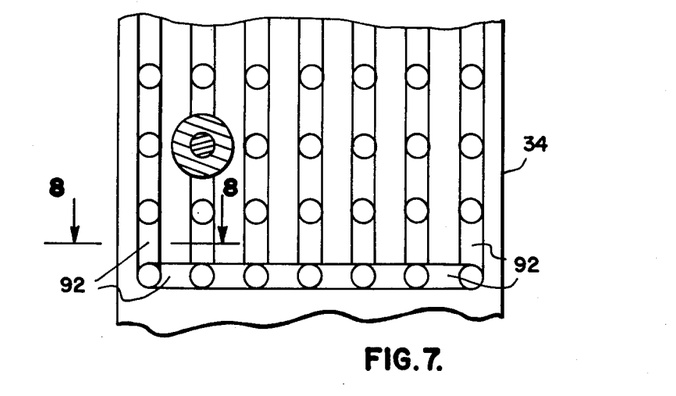
FIG. 7 is a reduced fragmentary sectional view taken from the line 7—7 of FIG. 5.

When the indexing assembly 30 is actuated to position wherein the projection 71 is at an end of either of the outermost rows of openings 72 as shown in FIG. 1, relief bars 130 or 132 may permit continuous rotation of the projection 71 upwardly through respective slots 134 or 136 at the end of the rows of openings 72; this function being shown best in FIG. 6 of the drawings wherein the member 130 is shown and this member 130 is pivoted on a pivot pin 138 on the plate 32. Rotation of the rotary actuator 60 causes the projection 71 to pass through the slot 134 and this merely raises the member 130 to the broken line position 140 and thus does not allow the projection 71 to become jammed against the plate 32. The same function occurs relative to the member 132 inasmuch as the entire mechanism may be reversed as hereinbefore described so that the reversal of the motor 96 will allow the row of openings 72 to be moved to the position wherein the slot 134 is over the rotary actuator or in the reverse direction to move the indexing means in a direction such that the rows of openings 72 are progressively engaged by the rotary actuator until the projection 71 thereof reaches the slot 176 over which the pivoted member 132 is positioned. Thus, it is possible to energize the single revolution clutch 94 on a continuous basis to return from one position to the other and such that the projection 71 automatically passes into a respective slot 134 or 136 and merely rotates therethrough without further moving the indexing means 30 or without jamming against the respective adjacent portions of the plate 32.

From the foregoing, it will be apparent that the plates 32 and 34 are 180° out of phase with the axis of the rotary actuator 60 which permits the rotary actuator 60 to rotate constantly in one direction and alternately to move the respective 32 and 34 in opposite directions and that the 180° cycling mechanism coupled with the lever 104 and the single revolution clutch, limits rotation of the shaft 62 and the rotary actuator 60 to 180° of rotation adjacent the end 36 so as to prevent both a lateral movement of the indexing means and a subsequent longitudinal movement which would be the case if the rotary actuator 60 were allowed to rotate 360 degrees in the position adjacent the end 36. It will be seen that the end of the projection 71 at its stop position, shown in FIG. 14 must be clear of each respective opening 74 in the plate 34 at the completion of each cycle of operation when the assembly is being moved in the direction of the arrow C as hereinbefore described.

As shown in FIGS. 15 to 20 of the drawings, a modification of the present invention comprises a rotary actuator having its axis disposed at right angles to the plane of an indexing plate and the rotary actuator comprises a radially disposed projection which engages projecting indexing pins extending from the said plate.

Figures 15, 16, 16A:
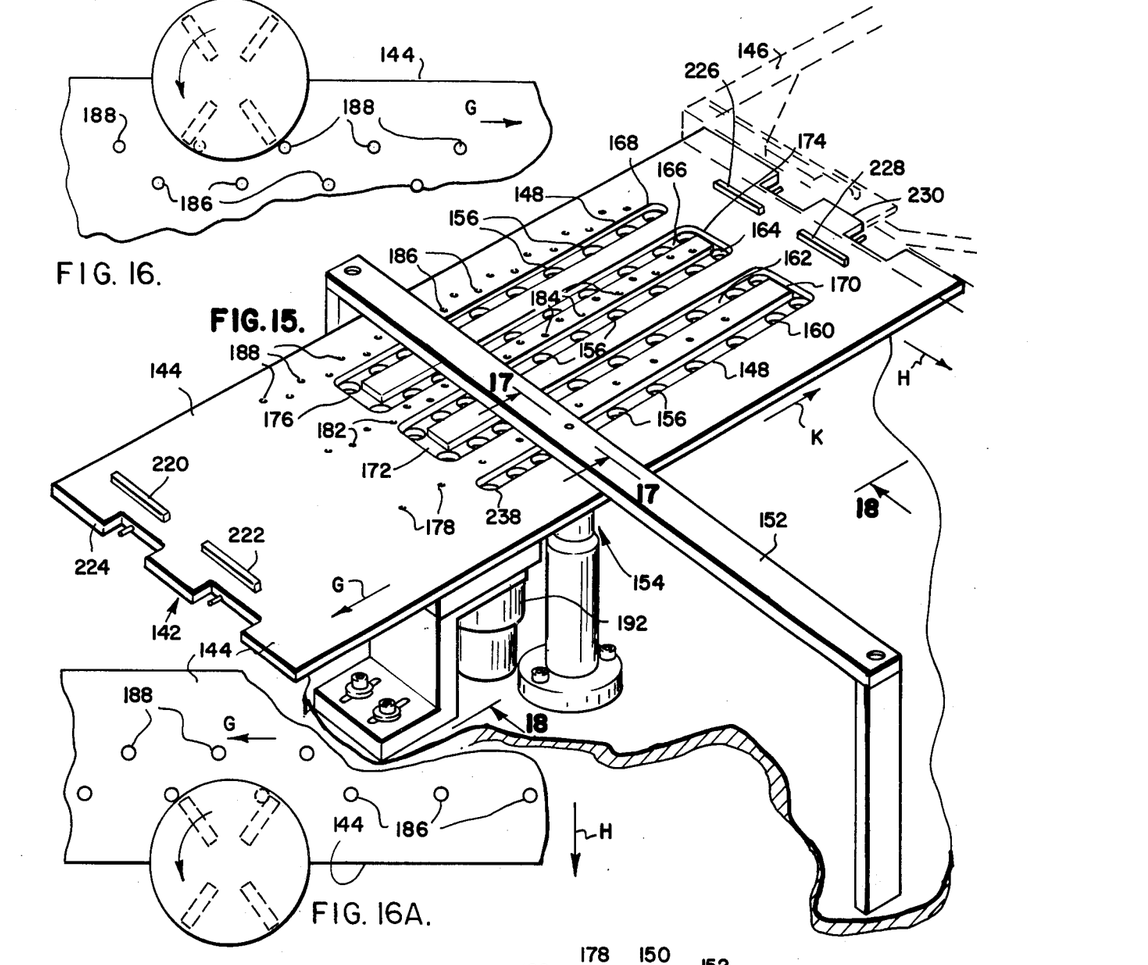
FIG. 15 is a fragmentary perspective view of a modification of the invention.
FIG. 16 is a diagrammatic view showing the phase relationship of the rotary actuator rotating in one direction, and the movement of the indexing means in one direction.
FIG. 16A is a diagramatic view showing the rotary actuator rotating in the one direction as illustrated in FIG. 16 and causing the indexing means to move in a reverse direction.

As shown in FIG. 15, an indexing means 142 consists of a substantially flat plate 144 which is mounted on a carriage as indicated by broken lines 146. This carriage 146 rigidly supports the plate 144 and mounts it for movement in back and forth directions horizontally and at right angles to each other similar to the mounting of the plates 32 and 34 on the frame 58 as hereinbefore described.

The plate 144 is provided with a serpentine shaped recessed track portion 148 in which a guide pin 150 is engaged and this guide pin 150 is supported by a rigid bar 152 carried stationarily on the base frame 155. Thus, the guide pin 150 is stationary and directly below the guide pin 150 is a spring loaded detent 154 which engages openings 156 at a lower side 158 of the plate 144.

Figure 17:
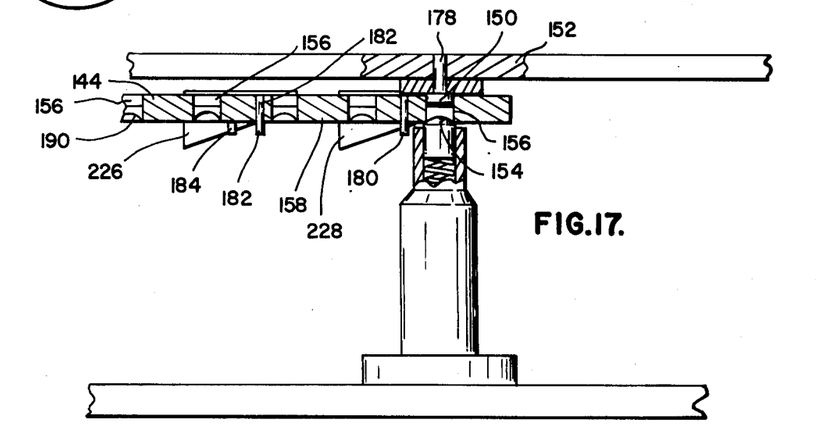
FIG. 17 is a fragmentary sectional view taken from the line 17—17 of FIG. 15.

The guide pin 150 stationarily mounted on the cross bar 152 is adapted to be traversed by the serpentine recess 148 and the openings 156 are spaced apart and in parallel rows in the bottom of the serpentine recess 148 all as shown best in FIGS. 15 and 17 of the drawings.

The serpentine path is composed of several longitudinal groove portions which are designated 160, 162, 164, 166 and 168. The recess or groove portions 160 and 162 are interconnected by a lateral groove portion 170 and the groove or track portions 162 and 164 are interconnected by a lateral groove portion 172. The groove track portions 164 and 166 are interconnected by a groove portion 174 and the groove portions 166 and 168 are interconnected by a groove portion 176.

As shown in FIGS. 15 and 17, indexing pins 178 are arranged in a row and located in parallel relationship between the groove portions 160 and 162. These pins 178 are provided with lower ends 180 which project below the lower surface 158 of the plate 144. These pins 178 are indexing pins related to the openings 156 in the bottom of the groove track portion 160. Another row of pins 182 correspond with the groove track portion 160. Another row of pins 182 correspond with the groove track portion 166 and the respective holes 156 therein and a further row of pins 188 correspond with the groove track portion 168 and the respective holes 156 therein.

All of the pins 178, 182, 184 and 186 and 188 project below the bottom 158 of the plate 144 as shown best in FIG. 17. These pins serve as indexing means in correspondence with the holes 156 in the various and respective rows of holes in the grooves and track portions 160, 162, 164, 166 and 168 as hereinbefore described.

In the bottom of the plate 144 and particularly the bottom portion 158 are groove track portions 190 which interconnect all of the openings 156 in the various groove track portions and these groove track portions 190 are adapted to be followed by a spheroid end portion of the detent 154 which is individually engageable with any one of the openings 156. The groove track portions 190 correspond with the hereinbefore described groove portions 92 disclosed in FIG. 7 through 10 inclusive of the drawings. Thus, the detent 154 maintains alignment of the plate 144 and its movement from one of the openings 156 to the next adjacent opening when the plate 144 is moved from one opening 156 to the next adjacent opening 156.

Figure 18:
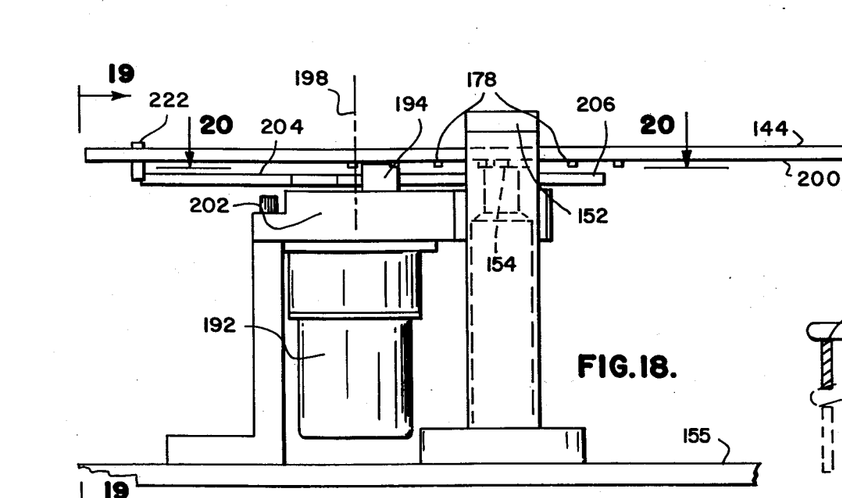
FIG. 18 is an end view of the specie shown in FIG. 15.
Figure 19:
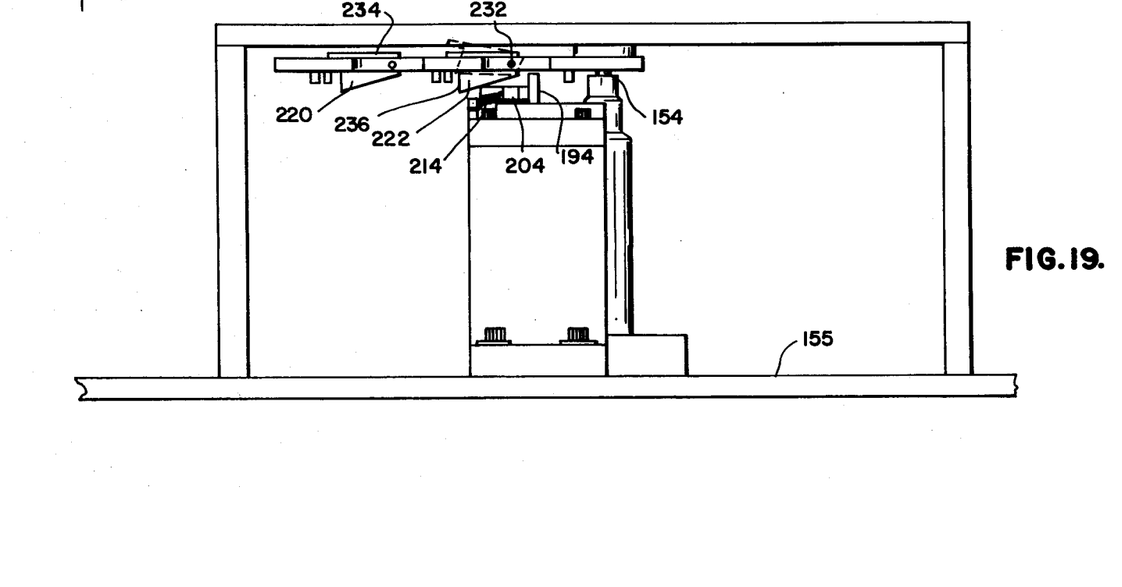
FIG. 19 is a view taken from the line 19—19 of FIG. 18.
Figure 20:
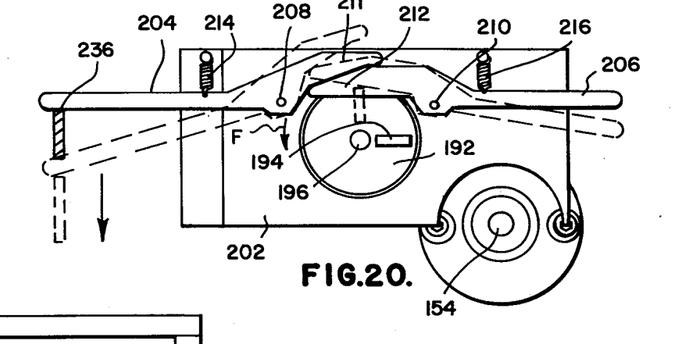
FIG. 20 is an enlarged planned sectional view taken from the line 20—20 of FIG. 18.

As shown in FIGS. 18, 19 and 20 of the drawings, a motor 192 operates a rotary actuator 194 which is mounted on a shaft 196 of the motor 192. The rotary actuator 194 is mounted on a substantially vertical axis 198 which is at right angles to the plane of the plate 144. This plate 144 is a substantially flat plate having a substantially flat plane 200 at its lower side from which the various pins 178, 182, 184, 186 and 188 project as hereinbefore described. The rotary actuator 194 is mounted eccentrically relative to the shaft 196 and its rotary axis 198 and as the rotary actuator rotates, it rotates continuously in one direction as indicated by the arrow F in FIG. 20 of the drawings. It is stopped momentarily by means of a single revolution clutch mechanism contained in a housing 202 in connection with the motor 192; the single revolution clutch being substantially as hereinbefore described but operating a full 360 degrees for each cycle of operation. Pivotally mounted on the housing 202 are a pair of cam levers 204 and 206 which are pivoted on pins 208 and 210 in connection with the housing 202. These leaves are provided with respective engaging and overlapping portions 211 and 212 respectively and are held normally by springs 214 and 216 in the solid line position shown in FIG. 20 as to be engaged by the rotary actuator 194 as it rotates about the rotary axis 198, hereinbefore described. The levers 204 and 216 are moved to the broken line position shown in FIG. 20 with each cycle of operation of the rotary actuator 194 as will be hereinafter described in detail.

The lever 204 is adapted to engage pivoted abutment members 220 and 222 at one end 224 of the plate 144 while the lever 206 is adapted to engage abutment members 226 and 228 at an end 230 of the plate 144. Each abutment member as substantially shown in FIG. 19 being mounted on a pivot pin 232 and being pivotal upwardly into a broken line position 234 as will be hereinafter described. The abutment member 22 being shown in FIG. 19 and having a vertical abutment edge 236 engageable by said lever 204 as is shown in FIGS. 19 and 20 of the drawings.

The rotary actuator 194 as it rotates engages pins 178 progressively from an end portion 238 of the groove 160 moves the plate 144 in the direction of an arrow G as shown in FIG. 15 of the drawings, until the lateral slot portion of the recess track designated 170 is reached whereupon the lever 206 engages the abutment 228 and with the respective revolution of the rotary actuator 194 moves the plate 144 in the direction of the arrow H to a position wherein the follower pin is located in the end of the slotted track portion 162. During movement along slotted portion 160 of the recessed track, the pins 178 are progressively rotatably engaged by the rotary actuator 194 and each pin 178 is spaced equal to a distance between the centers of the openings 156. Likewise, when the guide pin 150 is in the slotted track portion 162, the row of pins 182 are progressively engaged by the rotary actuator 194 and inasmuch as the plate has shifted such that the rotary actuator is 180 degrees out of phase with its movement against the pins 178 the plate 144 is then moved in the direction of the arrow until the slotted track portion 162 progresses over the guide pin 150 to a location of the lateral track portion 172.

The operation of the rotary actuator proceeds in this manner and as shown in FIG. 16, the rotary actuator finally reaches the slotted track portion 166 and progressively engages the pins 186 which moves the plate in the direction of arrow G whereupon the plate reaches the position where the guide pin 150 is at the lateral track portion 176 and the lever 204 engages the abutment member 220 which shifts the plate 144 in the direction of the arrow H so that the recess track 168 may be traversed by the pin 150 whereupon the rotary actuator is then in position to engage progressively the projecting pins 188 until the plate is moved in the direction of the arrow K until the end of the slotted track portion 168 reaches the guide pin 150.

It will be appreciated that the ends of the levers 204 and 206 only come in contact with the respective abutment members 220, 222, 226 and 228 when the last pin of each row is engaged and actuated and at all other times the levers 204 and 206 merely pivot without catching anything or without actuating the plate 144 laterally of the rows of openings 156.

It will be appreciated that the carrier 146 may transport a micro fiche having a number of photo-transparencies equal to the number of openings 156 and spaced equally relative thereto and thus the rectilinear actuator as shown in FIGS. 15 to 20 inclusive of the drawings operates in a similar manner to that hereinbefore described in connection with the FIGS. 1 to 14 inclusive of the drawings.

The specie of the invention shown in FIGS. 1 to 14 inclusive comprises a rotary actuator having an axis substantially parallel to a pair of flat plates which are disposed on opposite sides of the rotary axis of the rotary actuator and the rotary actuator rotates in the same direction and alternates at opposite ends of rows of indexing portions from one plate to the indexing portions of another plate such that the indexing portions of this particular indexing means are 180 degrees out of phase relative to the rotary actuator which always rotates in the same direction yet thereby causes alternate opposite directional movement of the indexing means. Likewise, the specie of the invention shown in FIGS. 15 to 20 accomplishes the same general function with the rotary actuator always rotating in the same direction yet reversing the direction of the indexing means alternately as the indexing means is moved laterally relative to the longitudinal rows or indexing portions whereby the rotary actuator rotates in the same direction and causes alternate opposite directional movement of the indexing means relative to the actuator and thus adjacent rows of indexing portions are 180 degrees out of phase relative to the peripheral movement of the rotary actuator and cam means operable by the rotary actuator shifts the indexing means such as the indexing plates laterally relative to the longitudinal rows of indexing portions at each end thereof to thereby progressively pass through a serpentine path of rows of indexing portions relative to the stationary rotary actuator which consistantly rotates in the same direction. The lateral movement of the indexing means relative to the rotary actuator is accomplished by cam means operable near opposite ends of the indexing means and this mechanism is common to both species; as for example a species in FIGS. 1 to 14 is operable such that the indexing means is moved laterally relative to the rows of indexing portions by means of angular cam slots while the species shown in FIGS. 14 to 20 is operable by cam means in the form of the levers 204 and 206 acting on the abutment members such as the abutment members 220, 222, 226, and 228.

Accordingly, both species operate similarly to reverse direction of the indexing means at each opposite end of the rows of indexing portions by a cam means for causing the indexing means to follow a generally serpentine path relative to a detent locating means and the principle difference is that the axis of the rotary actuator as shown in FIGS. 1 to 14 is substantially parallel to the planes of the indexing means and especially the plates thereof while the axis of the rotary actuator as disclosed in FIGS. 15 to 20 inclusive is disposed at right angles to the plane of the indexing means plate all as hereinbefore described.

I will be obvious to those skilled in the art that various modifications may be resorted to without departing from the spirit of the invention.

I claim:

1. In a rectilinear transport means; a stationary frame; a rotary actuator rotatably mounted on said frame on a stationary axis of rotation; indexing means moveably mounted on said frame to move in four directions relative thereto; two of said four directions being substantially at right angles to two of the remaining directions; said indexing means having a generally rectangular array of indexing portions; said indexing portions being spaced generally equally relative to each other and disposed in rows; said rows having adjacent respective opposite ends, said rows being substantially straight and said rows being spaced apart from each other substantially equal distances; lateral displacement means operable by said rotary actuator and at the ends of said rows; said lateral displacement means disposed to shift said indexing means in a direction laterally relative to said rows and to shift said indexing means a distance substantially equal to the distance between said rows; said lateral displacement means operable by a movement of said rotary actuator to an end of one of said rows; said rotary actuator having means disposed and adapted successively to engage and move one of said indexing portions with each revolution of said rotary actuator; said rotary actuator disposed to move said indexing means a distance equal to the distance between said indexing portions; and a single revolution control means disposed and adapted to drive said rotary actuator one revolution at a time; the indexing portions of adjacent ones of said laterally spaced apart rows of said indexing portions being disposed substantially 180° out of phase with each other relative to said rotary actuator and thus disposed for engagement with said rotary actuator whereby said rotary actuator continually rotates in one direction and drives one of said rows rectilinearly in one direction and successively drives the adjacent row of indexing portions rectilinearly in the opposite direction each time said lateral displacement means shifts said indexing means laterally relative to said rows and from an end of one row to a respective end of said adjacent row.

2. The invention as defined in claim 1, wherein: said lateral displacement comprises cam elements cooperable with said rotary actuator and engageable at the ends of said rows of said indexing portions for shifting said indexing means laterally from one row to an adjacent row.

3. The invention as defined in claim 1, wherein: yieldable detent means is stationarily mounted on said frame; said indexing means having detent portions engageable by said yieldable detent means; said detent portions disposed and spaced apart in correspondence with said indexing portions.

4. The invention as defined in claim 1, wherein: said indexing means comprises a substantially flat plate carrying said rows of said indexing portions; said plate having a continuous serpentine track disposed generally parallel with said rows; and a track engaging means stationarily mounted on said frame and engaged in said track.

5. The invention as defined in claim 1, wherein: yieldable detent means is stationarily mounted on said frame; said indexing means having detent portions engageable by said yieldable detent means; said detent portions disposed and spaced apart in correspondence with said indexing portions; said indexing means comprising a substantially flat plate carrying said rows of indexing portions; said plate having a continuous serpentine track disposed generally parallel with said rows; and a track engaging means stationarily mounted on said frame and engaged in said track.

6. The invention as defined in claim 4, wherein: said plate is provided with a side having a substantially flat plane; said axis of rotation of said rotary actuator being at substantially right angles to said flat plane; said indexing portions projecting from said flat plane and said rotary actuator having an eccentric projection adapted successively to engage said indexing portions and to thereby move said plate.

7. The invention as defined in claim 6, wherein: said lateral displacement means comprises a pair of pivoted levers pivotally mounted and having a stationary pivotal axis means supported by said frame; said levers having first moveable ends disposed to be pivoted by said eccentric projection of said rotary actuator; said levers having second moveable ends; lateral displacement projections carried by said plate adjacent to said ends of said rows of said indexing portions; said lateral displacement projections being disposed for engagement by said second moveable ends of said levers whereby said plate is moved laterally relative to said rows of indexing portions when an end of each row of indexing portions passes to said rotary actuator.

8. The invention as defined in claim 7, wherein: resilient means tends to pivot said levers at their first ends toward said eccentric projection of said rotary actuator.

9. The invention as defined in claim 8, wherein: said lateral displacement projections are pivoted on said plate and moveable out of the way of said levers when said plate is moved laterally to said rows in a direction opposite to that in which said plate is moved by said levers.

10. The invention as defined in claim 1, wherein: said indexing means comprises first and second plates each having substantially flat planes, said plates disposed in spaced apart generally relation to each other; said axis of rotation of said rotary actuator being between and disposed in substantially parallel to said flat planes; said rotary actuator being restrained against movement axially thereof; said rotary actuator having a radially disposed indexing portion; each of said plates having some of said rows of indexing portions; the rows of indexing portions of said first plate being laterally off set relative to respective adjacent rows of indexing portions of said second plates; and angular cam means coupled to said plates and disposed adjacent each end of each of said rows; said angular cam means extending laterally relative to said rows whereby said radially disposed projection of said rotary actuator progressively engages said indexing portions of one of said rows on one of said plates to the respective end thereof whereupon said projection of said rotary actuator engages one of said angular cam means and thereby shifts said plates to a position wherein said radially disposed projection of said rotary actuator is in alignment with one of said rows of indexing portions on the other one of said plates.

11. The invention as defined in claim 10, wherein: said angular cam means, adjacent one end of each of said rows, being angularly opposite to said angular cam means at the opposite end of each row.

12. The invention as defined in claim 11, wherein: said indexing portions comprising spaced apart openings in said plates; each plate having an open slot disposed directly opposite a row of said openings in the other one of said plates.

13. The invention as defined in claim 12, wherein: said slots are disposed between said rows of indexing portions; said angular cam means communicating with adjacent slots of said first and second plates.

14. The invention as defined in claim 1, wherein: said single revolution control means comprising a single revolution clutch coupled to said rotary actuator and adapted to rotate the same.

15. The invention as defined in claim 6, wherein: said single revolution control means comprising a single revolution clutch coupled to said rotary actuator and adapted to rotate the same.

16. The invention as defined in claim 10, wherein: said single revolution control means comprising a single revolution clutch coupled to said rotary actuator and adapted to drive the same.

17. The invention as defined in claim 16, wherein: 180° cycle means is operable by said indexing means when it is moved to a position at one end of said rows whereby said single revolution control means is limited to only approximately 180° of rotation to thereby limit rotation of said rotary actuator to only approximately 180° of rotation.

18. The invention as defined in claim 17, wherein: said single revolution clutch is disposed to stop rotation of said rotary actuator in a position wherein said indexing projection of said rotary actuator is between said plates; and said indexing projection thus disposed when near one end of one of said rows to engage one of said indexing portions and to finish a 360° revolution at the end of one of said angular cam means; and said indexing projection of said rotary actuator when near the opposite end of one of said rows is stopped by said clutch means near the entrance of said angular cam means whereupon said 180° cycle means limits the next successive rotary motion of said indexing projection to 180° of projection which traverses only the respective angular cam at said opposite end of said one of said rows.

19. In a rectilinear transport means; a stationary frame; a rotary actuator rotatably mounted on said frame on a stationary axis of rotation; indexing means moveably mounted on said frame to move in four directions relative thereto; two of said four directions being substantially at right angles to two of the remaining directions; said indexing means having a generally rectangular array of indexing portions; said indexing portions being spaced generally equally relative to each other and disposed in rows; said rows having adjacent respective opposite ends, said rows being substantially straight and said rows being spaced apart from each other substantially equal distances; lateral displacement means operable by said rotary actuator in correspondence with the ends of said rows; said lateral displacement means disposed to shift said indexing means in a direction laterally relative to said rows and to shift said indexing means a distance substantially equal to the distance between said rows; said lateral displacement means operable by a movement of said rotary actuator to a position corresponding with an end of one of said rows; said rotary actuator having means disposed and adapted successively to move one of said indexing portions with each rotary movement of said rotary actuator; said rotary actuator disposed to move said indexing means a distance equal to the distance between said indexing portions; and a rotary control means disposed and adapted to drive said rotary actuator; the indexing portions of adjacent ones of said laterally spaced apart rows of said indexing portions being disposed substantially 180° out of phase with each other relative to said rotary actuator and thus disposed for engagement with said rotary actuator whereby said rotary actuator continually rotates in one direction and drives one of said rows rectilinearally in one direction and successively drives the adjacent row of indexing portions rectilinearally in the opposite direction each time said lateral displacement means shifts said indexing means laterally relative to said rows and from an end of one row to a respective end of said adjacent row.

* * * * *